US010459680B2

United States Patent
Itasaka

(10) Patent No.: US 10,459,680 B2
(45) Date of Patent: Oct. 29, 2019

(54) DISPLAY DEVICE SUPPORT METHOD, DISPLAY DEVICE SUPPORT SYSTEM, AND ELECTRONIC DEVICE

(71) Applicant: SEIKO EPSON CORPORATION, Tokyo (JP)

(72) Inventor: Yosuke Itasaka, Tatsuno-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 99 days.

(21) Appl. No.: 15/449,393

(22) Filed: Mar. 3, 2017

(65) Prior Publication Data

US 2017/0277502 A1 Sep. 28, 2017

(30) Foreign Application Priority Data

Mar. 23, 2016 (JP) .................. 2016-059174

(51) Int. Cl.
| | |
|---|---|
| *G06F 3/14* | (2006.01) |
| *G04G 21/00* | (2010.01) |
| *G06F 1/16* | (2006.01) |
| *G06F 3/01* | (2006.01) |
| *G04G 21/02* | (2010.01) |

(52) U.S. Cl.
CPC ....... *G06F 3/1454* (2013.01); *G09G 2354/00* (2013.01)

(58) Field of Classification Search
CPC ........ G09G 5/14; G09G 2370/16; G06F 3/14; G06F 3/1423
See application file for complete search history.

(56) References Cited

U.S. PATENT DOCUMENTS

| | | | |
|---|---|---|---|
| 2002/0068600 A1 | 6/2002 | Chihara et al. | |
| 2010/0261507 A1* | 10/2010 | Chang | G06F 3/1454 455/566 |
| 2012/0088548 A1* | 4/2012 | Yun | G08C 17/02 455/557 |
| 2013/0278484 A1* | 10/2013 | Hwang | G06F 3/1423 345/2.3 |
| 2015/0012581 A1* | 1/2015 | Kim | H04W 4/70 709/201 |
| 2015/0020081 A1* | 1/2015 | Cho | G06F 9/542 719/318 |
| 2015/0168920 A1 | 6/2015 | Nishihara | |
| 2015/0245166 A1* | 8/2015 | Lee | H04M 1/7253 455/41.2 |
| 2016/0158602 A1 | 2/2016 | Lee et al. | |

FOREIGN PATENT DOCUMENTS

| | | |
|---|---|---|
| JP | 2003-006112 A | 1/2003 |
| JP | 2008-139167 A | 6/2008 |
| JP | 2015-117992 A | 6/2015 |
| JP | 2015-531268 A | 11/2015 |
| WO | 2001/099393 A1 | 12/2001 |

* cited by examiner

*Primary Examiner* — Kevin M Nguyen
(74) *Attorney, Agent, or Firm* — Oliff PLC

(57) ABSTRACT

An electronic device includes: an acquisition unit which acquires information of an object displayed on a display device attached to a user or an exercise tool and supplementary information about the object; and a display unit which displays the object and a function of the object on a display unit, using the information of the object and the supplementary information that are acquired.

13 Claims, 14 Drawing Sheets

| | | |
|---|---|---|
| ▭▭▭▭▭ | IMPROVE EXPLOSIVENESS AND ATHLETIC ABILITY | 90~100% |
| ▭▭▭▭▭ | IMPROVE MUSCLE STRENGTH AND BASAL METABOLISM | 80~90% |
| ▭▭▭▭▭ | IMPROVE ENDURANCE | 70~80% |
| ▭▭▭▭▭ | | 60~70% |
| ▭▭▭▭▭ | BURN FAT AND LOSE WEIGHT | 50~60% |
| ▭▭▭▭▭ | | 40~50% |
| ▭▭▭▭▭ | WARM-UP | 0~40% |

DISPLAY DEVICE SUPPORT METHOD, DISPLAY DEVICE SUPPORT SYSTEM, AND ELECTRONIC DEVICE

CROSS-REFERENCE TO RELATED APPLICATION

This application claims priority from Japanese patent application JP 2016-059174 filed Mar. 23, 2016, which is incorporated herein by reference in its entirety.

BACKGROUND

1. Technical Field

The present invention relates to a display device support method, a display device support system, and an electronic device or the like.

2. Related Art

JP-T-2015-531268 discloses a wrist-wearable device which functions as a fitness monitor as well as a time display. JP-A-2015-117992 discloses a wrist-wearable electronic timepiece capable of a function switching operation in which one of a plurality of executable operation modes is selected and in which the mode of the timepiece is switched to the selected mode. This electronic timepiece can accept an external operation from a smartphone in addition to a normal operation in which an operation unit provided on the electronic timepiece itself is operated to switch functions.

Even in a wrist-wearable device in which complex operations are hard to carry out because the number of press button switches is limited, as JP-T-2015-531268 and JP-A-2015-117992, it is possible to implement more diverse functions without reducing the convenience of the operations of the wrist-wearable device, by accepting an external operation from a smartphone, as in JP-A-2015-117992.

A portable display device is very convenient because it is mounted on the user's wrist and carried in this way like a wrist-wearable device, for example. However, if the user constantly relies on another device such as a smartphone in order to carry out the operation of changing the operation mode while carrying the device, there is a risk of spoiling the original functions of the portable display device.

SUMMARY

An advantage of some aspects of the invention is to provide a display device support method, a display device support system, and an electronic device for supporting a display device in which functions of a display device such as a portable device with restrictions on the installation of a display unit are learned by an electronic device that is different from the display device, thus enabling supporting the user so that the user can make full use of the display device without relying on the electronic device at the time of using the display device.

An advantage of some another aspects of the invention is to provide a device support method in which functions of a display unit or an operation unit of a device are learned by an electronic device that is different from the device, thus enabling supporting the user so that the user can make full use of the device.

(1) An aspect of the invention relates to a display device support method including: causing an electronic device to acquire information of an object displayed on a display device attached to a user or an exercise tool and supplementary information about the object; and displaying the object and a function of the object on a display unit provided in the electronic device, using the information of the object and the supplementary information that are acquired.

According to the aspect of the invention, by displaying an object and the function of the object on the display unit provided in the electronic device, using the information of the object displayed on the display device and the supplementary information about the object, it is possible to support the user to make full use of the display device without relying on the electronic device at the time of using the display device.

(2) In the aspect of the invention, the display device support method may include displaying a first operation unit provided in the display device, on the display unit, and explaining a function of the first operation unit. In this case, the object displayed on the electronic device is the first operation unit provided in the display device. Here, the first operation unit is an operation button, operation key, operation voice input unit, vibration detection unit to which operation vibration is inputted, touch panel display unit, or the like. On the electronic device, such a first operation unit is displayed and the function of the first operation unit is displayed as well.

(3) In the aspect of the invention, the display device support method may include acquiring input information inputted to the display device in order to change a display content of the object displayed on the display device; and changing the object displayed on the display unit according to the display content on the basis of the input information and displaying the changed object. In this way, by displaying various objects displayed on the display device, on the electronic device, where the display is easier to view than on the display device, for example, it is possible to allow the user to have a simulated experience of the use of the display device in advance when not actually using the display device.

(4) In the aspect of the invention, the function of the object displayed on the display unit may be changed according to the display content, using the supplementary information, and the changed object may be displayed. In this way, by causing the electronic device to display the functions of various objects displayed on the display device and thus allow the user to recognize these functions, it is possible to allow the user to have a more detailed simulated experience of the use of the display device in advance when not actually using the display device.

(5) In the aspect of the invention, the display device support method may include changing the object displayed on the display unit to another object on the basis of information other than the supplementary information that is preset in the electronic device, when an operation unit provided in the electronic device is operated. That is, the content displayed on the display unit of the electronic device can be changed not only when the operation unit of the display device is operated but also by operating the operation unit of the electronic device. Thus, by operating the operation unit of the electronic device, it is possible to change the content displayed on the display unit of the electronic device, for example, skip the content.

(6) Another aspect of the invention relates to an electronic device including: an acquisition unit which acquires information of an object displayed on a display device attached to a user or an exercise tool and supplementary information about the object; and a display unit which displays the object and a function of the object, using the information of the object and the supplementary information that are acquired.

According to the aspect of the invention, the display device support method according to the one aspect can be preferably implemented.

(7) In the aspect of the invention, the display unit may have a larger display area than a first display unit provided in the display device. That is, the first display device provided in the display device has a small display area due to the demand for smaller size and the like, and even if the first display device can display the function of an object, it is hard to view the display. However, by displaying function of the object on the display unit of the electronic device with a larger display area instead, it is possible to allow the user to recognize the function of the object.

(8) In the aspect of the invention, the electronic device may further include an operation unit to which information to change the object displayed on the display unit to another object is inputted. Thus, by operating the operation unit of the electronic device, it is possible to change the content displayed on the display unit of the electronic device, for example, skip the content.

(9) Still another aspect of the invention relates to a display device support system including: a display device which is attached to a user or an exercise tool and displays an object; and an electronic device which supports an operation of the display device. The electronic includes: an acquisition unit which acquires information of the object and supplementary information about the object; and a display unit which displays the object and a function of the object, using the information of the object and the supplementary information that are acquired. The display unit has a larger display area than a first display unit provided in the display device.

According to the aspect of the invention, by displaying an object and the function of the object on the display unit provided in the electronic device, using the information of the object displayed on the display device and the supplementary information about the object, it is possible to support the user to make full use of the display device without relying on the electronic device at the time of using the display device.

(10) Yet another aspect of the invention relates to a display device support program causing a computer to execute: causing the computer to acquire information of an object displayed by a display device attached to a user or an exercise tool and supplementary information about the object; and causing a display unit connected to the computer to display the object and a function of the object, using the information of the object and the supplementary information that are acquired.

The display device support program according to the aspect of the invention can be provided as a built-in program in a storage device of an electronic device, or installed in the storage device of the electronic device from the display device, a server or a storage medium. Thus, the program can take control of the execution of the display device support method according to the aspect of the invention.

(11) Still yet another aspect of the invention relates to a computer-readable recording medium having a display device support program recorded therein. This recording medium can be used as a storage device of an electronic device or can be used as a recording medium from which the program is installed in the storage device of the electronic device.

(12) Further another aspect of the invention relates to a device support method including: when a communication environment is established between a device which includes at least one of an operation unit and a display unit and which is attached to a user or an exercise tool, and an electronic device, causing the electronic device to acquire information about a function of at least one of the operation unit and the display unit; and causing the electronic device to output the function, using the information that is acquired.

According to the aspect of the invention, when a communication environment is established between the device and the electronic device, it is possible to cause the electronic device to acquire, from the device, the information about the function of at least one of the operation unit and the display unit provided in the device, and to output the acquired information. Thus, the user can be supported to make full use of the device without relying on the electronic device when using the device. Here, the output from the electronic device may be the display output described above or an output other than the display output, such as an audio output, for example.

(13) Still further another aspect of the invention relates to a device support method including: causing an electronic device to acquire, from a device including an operation unit and attached to a user or an exercise tool, information about a function of the operation unit; and outputting the function, using the information that is acquired, when the operation unit is operated.

According to the aspect of the invention, after the electronic device acquires the information about the function of the operation unit from the device having the operation unit and when the operation unit is operated, the electronic device can output the function of the operation unit of the device, using the acquired information. Thus, the user can be guided to make full use of the device without relying on the electronic device when using the device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter a preferred embodiment of the invention will be described in detail with reference to the drawings. The embodiment below should not unduly limit the contents of the invention described in the appended claims. Also, not all the configurations described below are necessarily essential elements of the invention.

1. Display Device (Device) Support System

Figure 1:
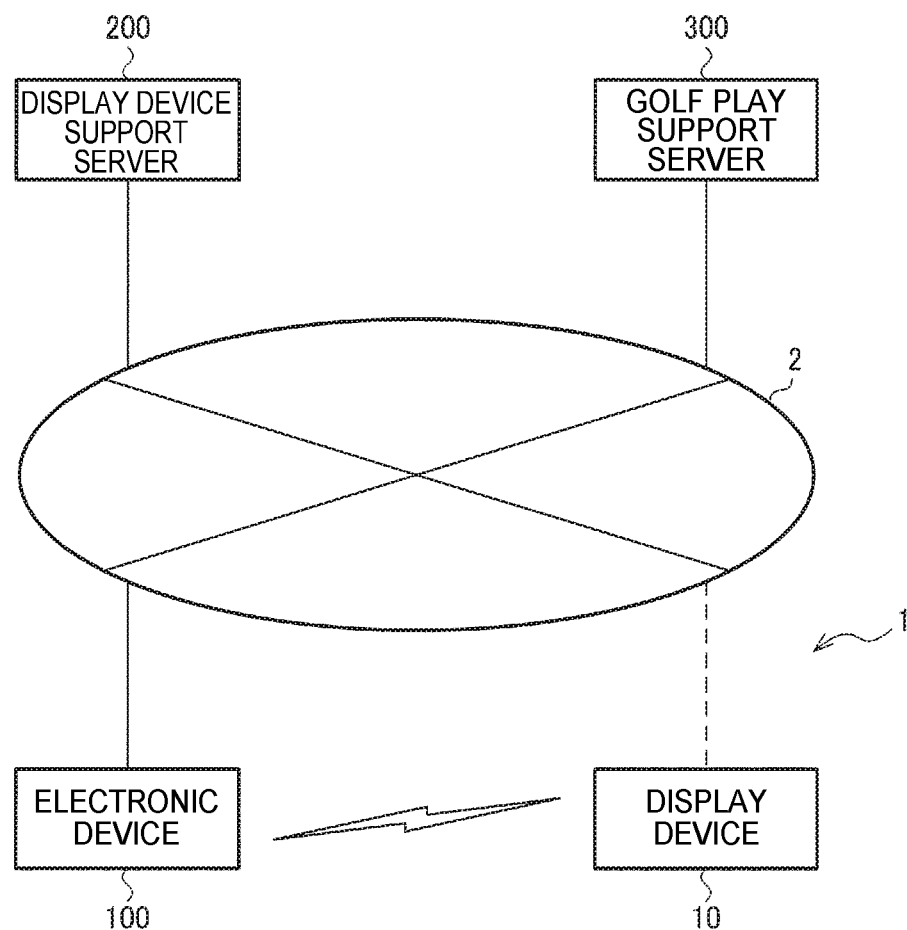
FIG. 1 shows a display device support system according to an embodiment of the invention.

As shown in FIG. 1, a display device support system 1 includes a display device (in a broad sense, device) 10 and an electronic device 100 which supports the display device 10. The display device 10 and the electronic device 100 are wire-connected or wirelessly connected and are capable of short-range communication, preferably, using Bluetooth (trademark registered), infrared rays or the like.

In the embodiment, the electronic device 100 is connected to a network, for example, the internet 2. The display device 10 may be connected to the internet 2. Also, a display device support server 200 and a golf play support server 300 are connected to the internet 2. The display device support server 200 downloads a program for the electronic device 100 to support the display device 10, to the electronic device 100. Instead of this, a program for supporting the display device 10 may be downloaded in the electronic device 100 from the display device 10. The golf play support server 300 downloads a golf play support program, golf map, hole information, distance information and the like for executing golf play support, which is one of the functions of the display device 10, to the display device 10 via the internet 2 and the electronic device 100, or directly from the internet 2. The golf play support is only an example and other application programs may be downloaded as well. If the display device 10 has a built-in program, there is no need to download the program to the display device 10.

Figure 2:
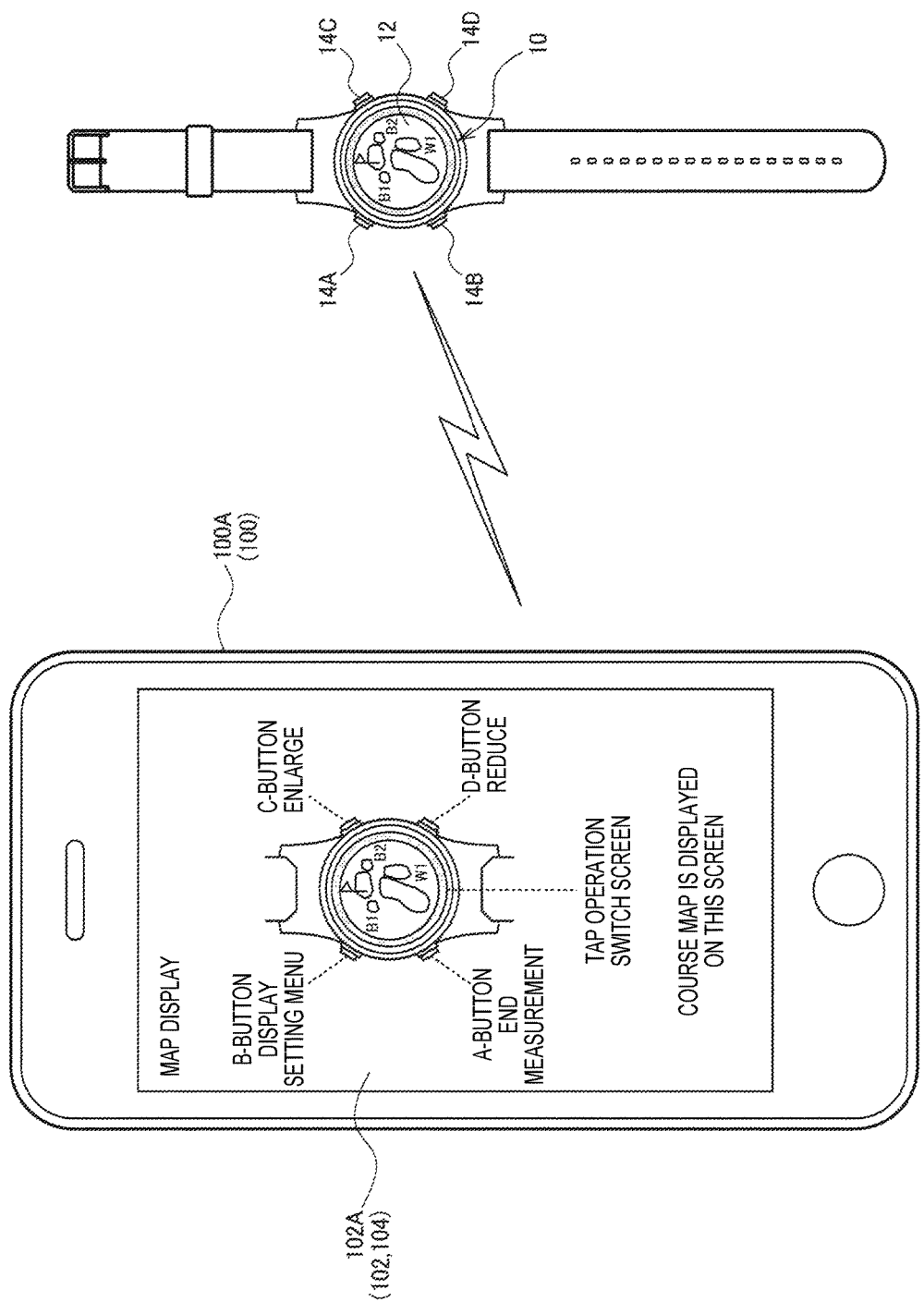
FIG. 2 shows an example of an electronic device and a display device to which the invention is applied.
Figure 3:
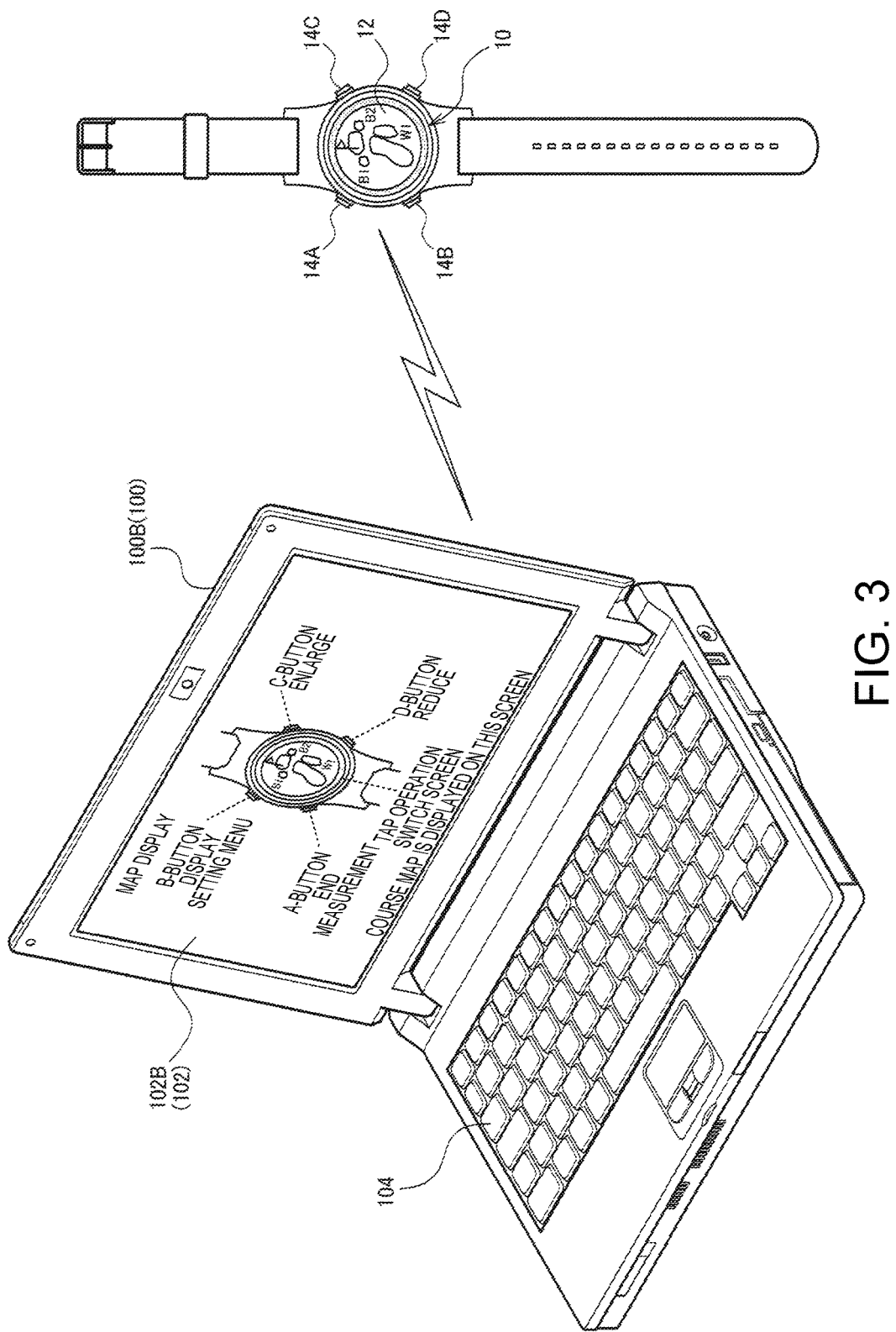
FIG. 3 shows another example of an electronic device and a display device to which the invention is applied.
Figure 4:
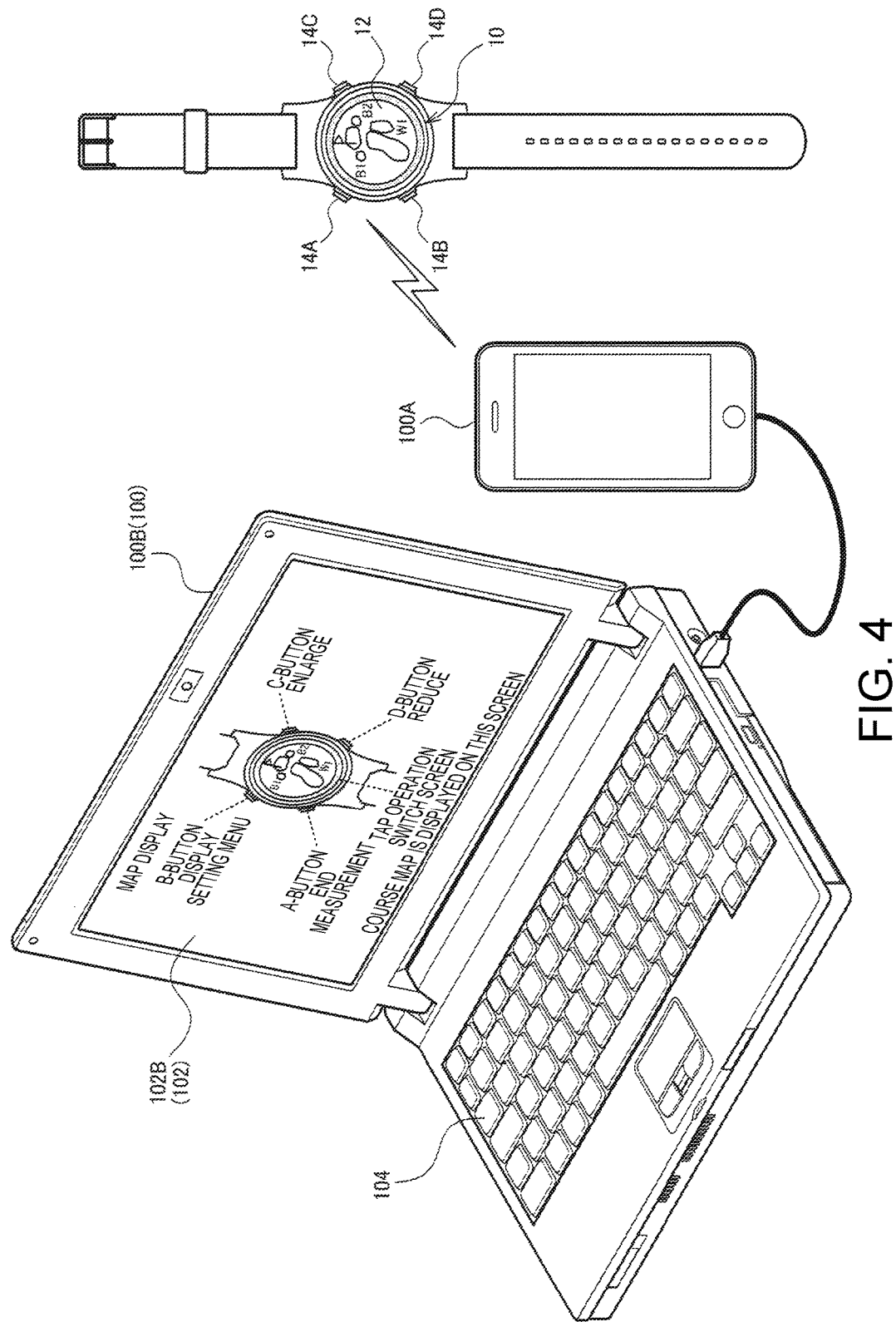
FIG. 4 shows still another example of an electronic device and a display device to which the invention is applied.

FIGS. 2 to 4 show examples of the combination of the display device 10 and the electronic device 100. In FIGS. 2 to 4, the display device 10 is a portable device, for example, a wrist-wearable portable device. The display device 10 has a display unit 12 made up of a dot-matrix flat panel, and an operation unit 14 including push buttons 14A to 14D. However, the device to be supported is not limited to the display device 10. In a broad sense, the device to be support may have one of the display unit and the operation unit.

In FIG. 2, the electronic device 100 is a smartphone 100A. In FIG. 3, the electronic device 100 is a personal computer (hereinafter abbreviated as PC) 100B. In FIG. 4, the electronic device 100 is a personal computer 100B using a smartphone 100A as a communication medium with the display device 10. In FIGS. 2 to 4, a display unit 102 of the electronic device 100 (a display unit 102A of the smartphone 100A, and a display unit 102B of the PC 100B) has a larger display screen than the display unit 12 of the display device 10. Here, the display unit 102 of the electronic device 100 is also referred to as a first display unit in order to be discriminated from the display unit 12 of the display device 10. The electronic device 100 also has an operation unit 104 (the smartphone 100A has the touch panel display unit 102A for this function as well, and the PC 100B has a keyboard 104B or a mouse or the like, not illustrated). This operation unit 104 is similarly referred to as a first operation unit in order to be discriminated from the operation unit 14 of the display device 10.

2. Display Device

Figure 5:
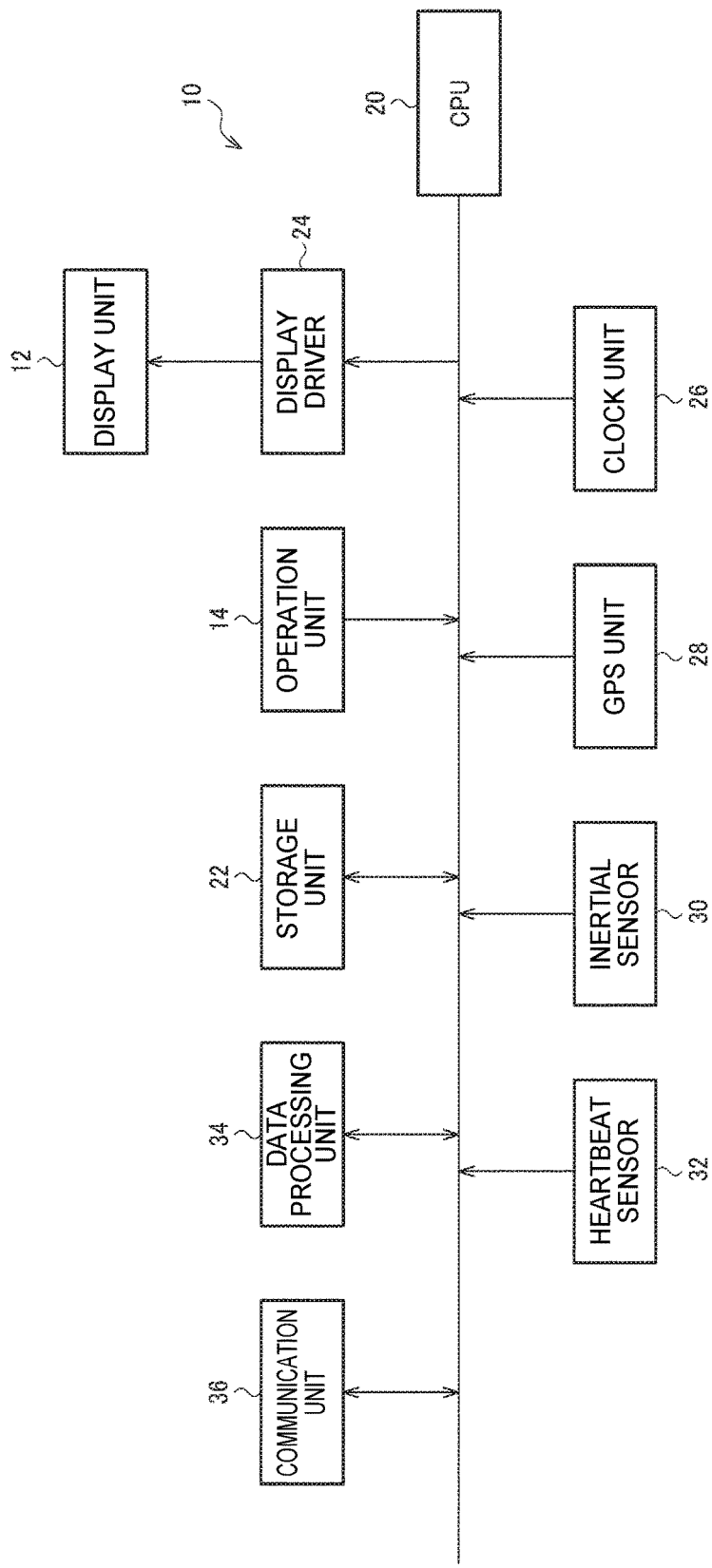
FIG. 5 is a schematic block diagram of a display device to be supported.

FIG. 5 is a schematic block diagram of the display device 10 to be supported. The display device 10 has a CPU 20 responsible for controlling the display device 10. To a bus line of this CPU 20, the following units as well as the operation unit 14 is connected. In a storage unit 22, a basic program to execute basic functions of the display device 10 and various data or the like including a golf course map or the like acquired from the golf play support server 300 are stored. In the storage unit 22, object data and its supplementary information acquired from the display device 10 are stored as well.

A display driver 24 drives the display unit 12 to show a display. A clock unit 26 divides a reference frequency from an oscillator and generates time information. A GPS (Global Positioning System) unit 28 receives signals from GPS satellites and calculates the current position of the display device 10. An inertial sensor 30 includes an acceleration sensor, for example, and detects acceleration to detect whether a tap operation has been done or not, for example. The inertial sensor 30 may further include an angular velocity sensor and detect the angular velocity when the user swings a golf club. A heartbeat sensor (pulse sensor, pulse wave sensor or the like) 32 detects the heartbeat of the user wearing this display device 10.

A data processing unit 34 has data inputted from the GPS unit 28, the inertial sensor 30, the heartbeat sensor 32 and the like and carries out necessary data processing. An example of data processing may be the calculation of the distance from the current position to the target on the golf course, determination on which of predetermined heartbeat zones the detected heart rate belongs to, and the like. Display data generated by the data processing unit 34 includes a golf course map, object data such as a symbol mark indicating heartbeat, and character data. A communication unit 36 communicates data with the electronic device 100 and can connect to the internet 2 when necessary.

Figure 6:
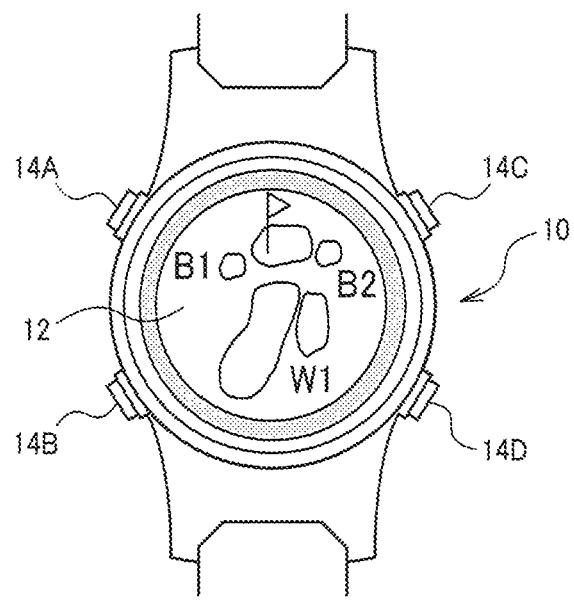
FIG. 6 shows an example of a display state in the display unit of the display device.

Next, an example of the display form on the display unit 12 of the display device 10 will be described with reference to FIGS. 6 to 9. FIG. 6 shows an example of a map display in which the displayed object is a golf course map. FIG. 6 shows the state where objects indicating the fairway, bunkers B1, B2, water hazard W1, and the green or the like located ahead in the ball hitting direction from the current position on the golf course calculated by the GPS unit 28 are displayed on the display unit 12. This display state can be changed by operating the operation unit 14.

Here, the operation unit 14 of the display device 10 includes operation buttons 14A to 14D. The operation button 14A is to input an operation to end the measurement by the inertial sensor 30 or the heartbeat sensor 32 or the like, for example. The operation button 14B is to input an operation to display a setting menu. The operation buttons 14C and 14D may have different functions depending on the contents of the screen displayed on the display unit 12. On one screen, the operation button 14C is to input an operation to enlarge the display and the operation button 14D is to input an operation to reduce the display. On another screen, the operation button 14C is to input an operation to scroll up the display and the operation button 14D is to input an operation to scroll down the display. On still another screen, the operation buttons 14C and 14D are used to switch between displays. In addition, a tap operation in which the display unit 12 of the display device 10 is briefly tapped once enables switching between displays. Whether a tap operation has been done or not is determined on the basis of an output from the acceleration sensor 30.

Figure 7:
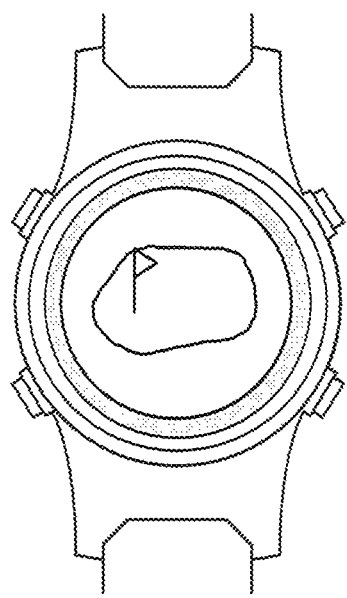
FIG. 7 shows another display state obtained by performing an operation from the display state shown in FIG. 6.

FIG. 7 shows an enlarged display state of the green, which is an object, as another map display state obtained by operating the operation button 14C from the map display state shown in FIG. 6. To return to the display shown in FIG. 6 from the display shown in FIG. 7, the operation button 14D can be operated to reduce the display.

Figure 8:
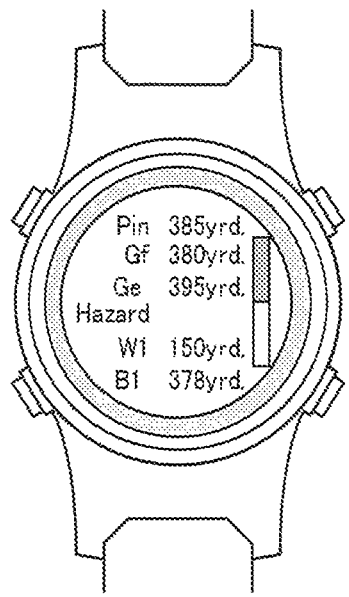
FIG. 8 shows still another display state obtained by performing another operation from the display state shown in FIG. 6.

FIG. 8 shows the display of the distance from the current position to each place, as another display state that can be switched to by a tap operation in which the display unit 12 is briefly tapped once from the map display state shown in FIG. 6. The data processing unit 34 shown in FIG. 5 calculates the distance from the current position to a target such as a pin on the green, for example, on the basis of the current position acquired by the GPS unit 28 and the distance data on the golf course acquired from the golf play support server 300. The distance data is displayed on the display unit 12 via the display driver 24. FIG. 8 shows a scroll bar as an object.

Figure 9:
FIG. 9 shows still another display state obtained by performing an operation from the display state shown in FIG. 8.

FIG. 9 shows the display of heartbeat, as another display state that can be switched to by a tap operation from the distance display state shown in FIG. 8. The data processing unit 34 shown in FIG. 5 calculates a heart rate "92" on the basis of a signal from the heartbeat sensor 32 and determines that the heart rate "92" is in a zone 1 of five predetermined heartbeat zones. The heart rate "92" is displayed in the center area of the display unit 12 along with a heart-shaped object indicating heartbeat. The heartbeat zone 1 is displayed as an arcuate object at a part of five areas divided from a circumferential area on the peripheral edge of the display unit 12.

Here, for example, the meaning of the two alphabet letters shown in the display screen of FIG. 8 and the meaning of the dark upper half part in the vertical frame are unknown to a beginner who has just begun using the display device 10. The meaning of the heartbeat zone 1 in FIG. 9 is unknown to a beginner, too. Moreover, not only the display contents on the display screen but also the functions of the operation unit 14 are unknown to a beginner. Particularly, the functions of the operation buttons 14C and 14D are different between the display state shown in FIGS. 6 and 7, the display state of FIG. 8, and the display state of FIG. 9, and how these differ is unknown to a beginner if not explained. However, since the display device 10 needs to be small-sized as a wrist-wearable device, the display unit 12 cannot be increased in size to add an explanation of the display contents. Also, some devices to be supported have no display unit in the first place. In such cases, a beginner must check these matters in a bulky user's manual, which is complicated and troublesome.

3. Electronic Device Supporting Display Device

Figure 10:
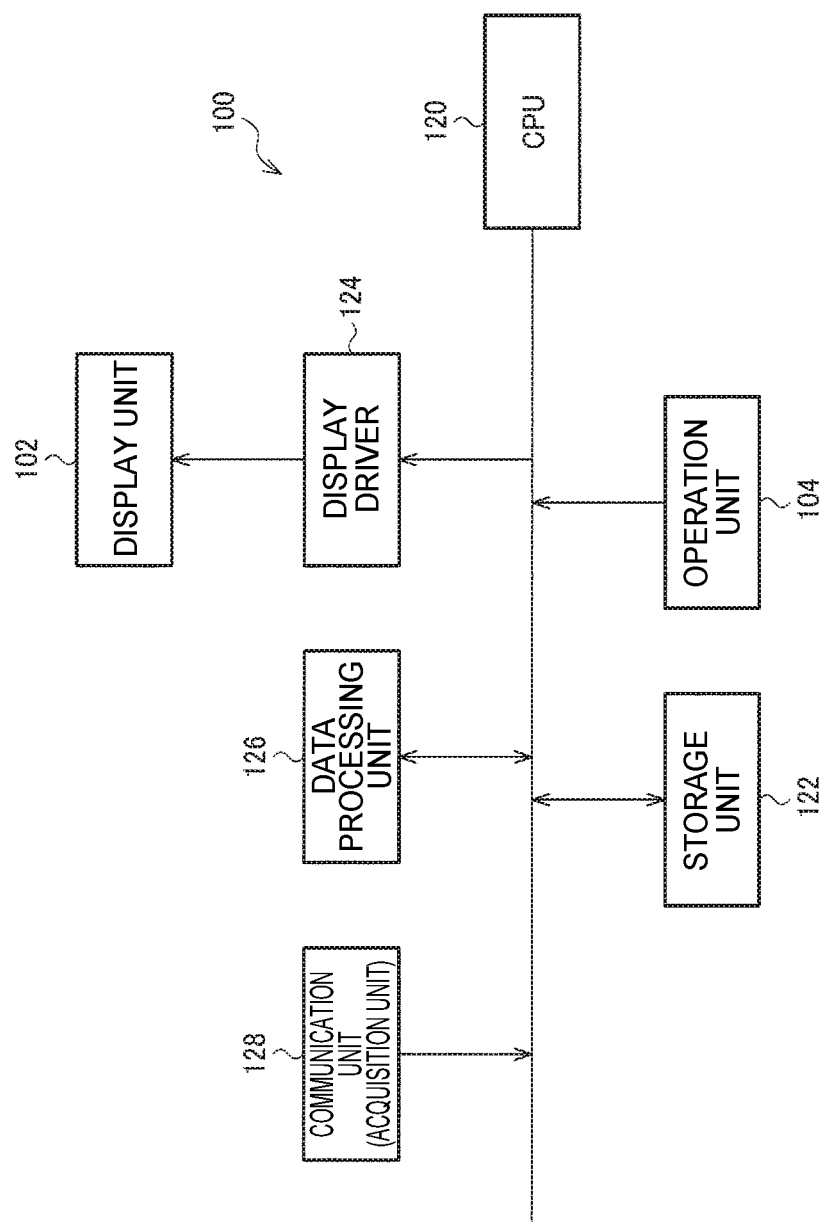
FIG. 10 is a schematic block diagram of an electronic device which supports a display device.

FIG. 10 is a schematic block diagram of the electronic device 100 supporting the display device 10. The electronic device 100 has a CPU 120 responsible for controlling the electronic device 100. To a bus line of the CPU 120, the following units as well as the operation unit 104 is connected. In a storage unit 122, a basic program to execute basic functions of the electronic device 100, a display device support program acquired from the display device support server 200, and various data and the like are stored.

A display driver 124 drives the display unit 102 to show a display. A data processing unit 126 has various data inputted, carries out data processing according to the basic program or the display device support program, and generates display data to be displayed on the display unit 102. The display data includes object data such as a golf course, and text data such as a written explanation as its supplementary information. A communication unit 128 communicates data with the display device 10 or connects to the internet 2 and thus acquires programs and data. Therefore, the communication unit 128 is also referred to as an acquisition unit. The data processing unit 126 processes data acquired from the operation unit 104, the storage unit 122, and the communication unit 128.

Figure 11:
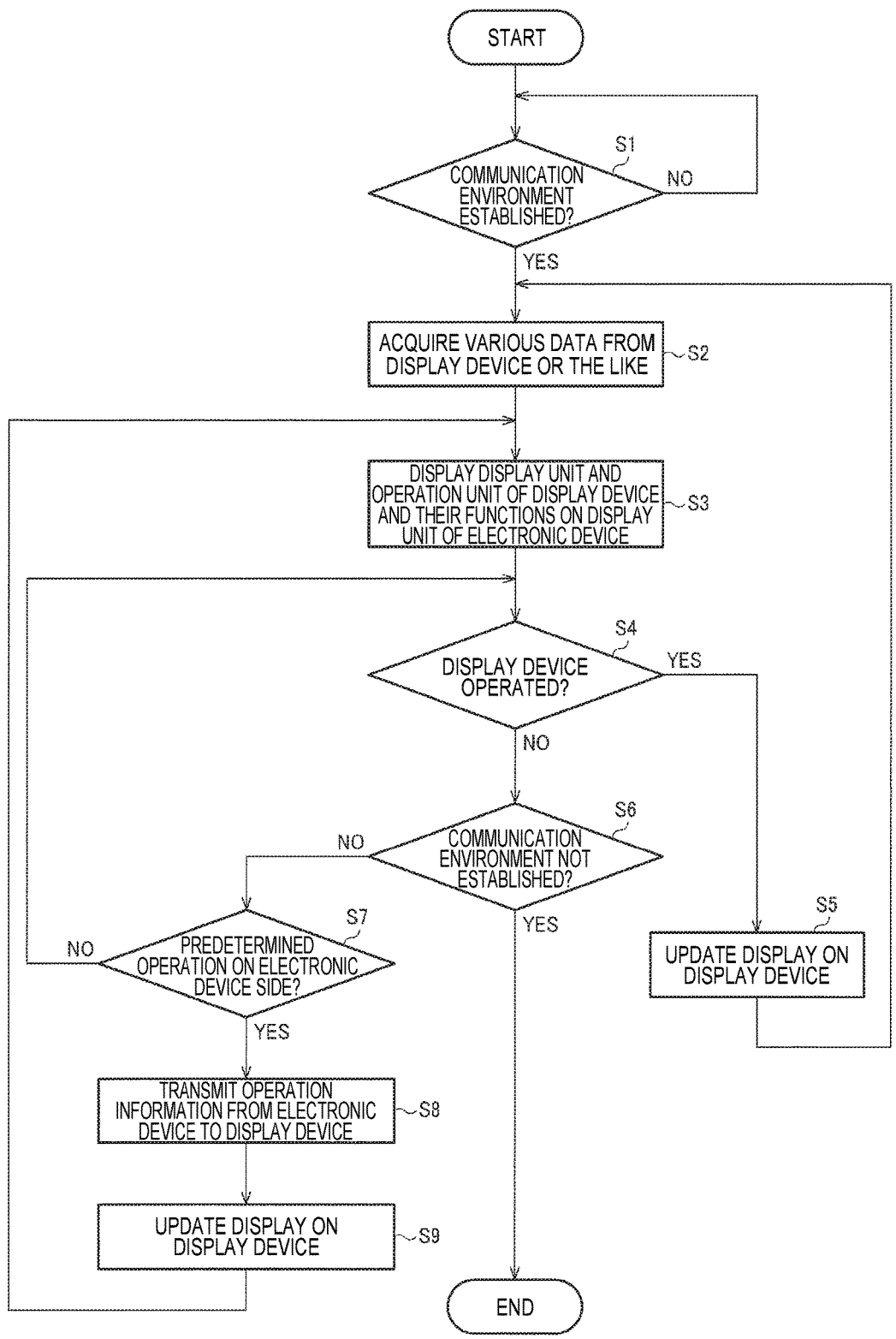
FIG. 11 is an operation flowchart of the electronic device which supports the display device.

Next, the display device support operation by the electronic device 100 will be described with reference to the flowchart of FIG. 11. It is assumed that the electronic device 100 has already acquired the display device support program. In FIG. 11, the electronic device 100 determines whether a communication environment such as short-range communication, for example, has been established with the display device 10 or not (Step 1). If a communication environment has been established (YES in Step 1), the electronic device 100 enters into a display device support mode and causes the communication unit 128 to acquire various data from the display device 10 or the display device support server 200 (Step 2). The various data includes object information and its supplementary information acquired from the display device 10 according to the display device support program. The supplementary information includes text data of a written explanation of the object. The supplementary information may also include data about the method of communication with the display device 10. Moreover, the supplementary information may include data about an operation that enables the electronic device 100 change to the display contents on the display unit 12 of the display device 10. In a broader sense, the information acquired by the electronic device 100 from the display device 10 according to the display device support program is information about the functions of at least one of the display unit 12 and the operation unit 14 of the display device 10. In a narrower sense, this information is an explanation about at least one object of the display unit 12 and the operation unit 14 of the display device 10 (including the display contents on the display unit 12) and the functions of at least one of the display unit 12 and the operation unit 14. The information acquired from the display device 10 may also be acquired from the display device support server 200. In this case, the display device support server 200 can transmit necessary information to the electronic device 100 in response to an operation on the display device 10 as a trigger.

Figure 12:
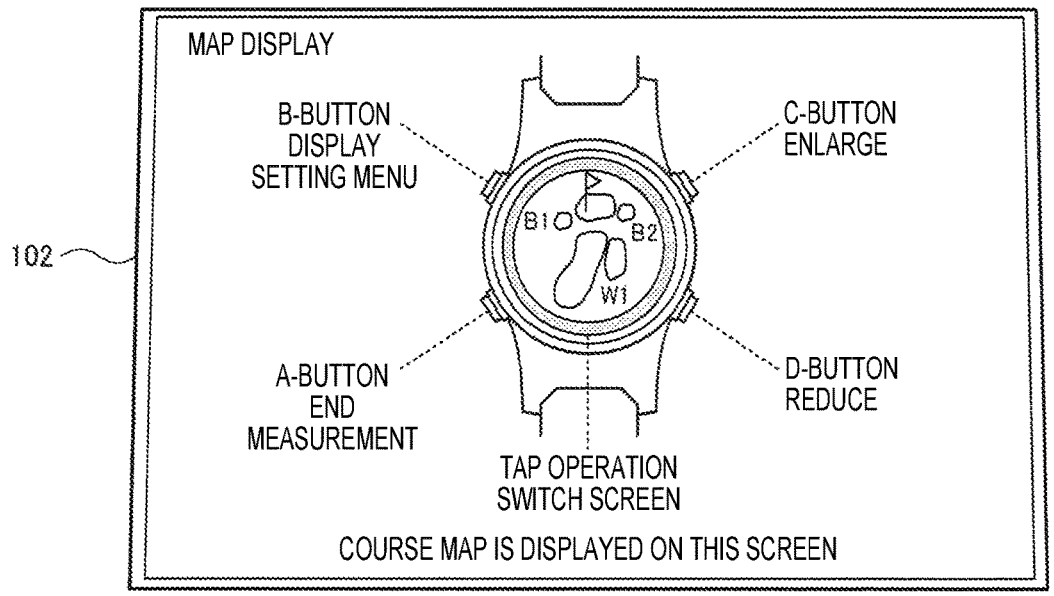
FIG. 12 shows a support screen displayed on the electronic device when the display screen on the display device is as shown in FIG. 6.

After acquiring the data, the electronic device 100 causes the display unit 102 of the electronic device 100 to show a display as shown in FIG. 12, for example, on the basis of the object and the text data of the written explanation displayed on the display unit 12 of the display device 10 (Step 3). Here, in FIG. 12, the display unit 12 and the operation unit 14 of the display device 10 shown in FIG. 6, the object (map) and characters displayed on the display unit 12, and the explanation of the functions of the display unit 12 and the operation unit 14 are displayed. In FIG. 12, as the explanation of the function of the display unit 12 of the display device 10, "a course map is displayed on this screen" is displayed. As the explanation of the function of the operation unit 14 of the display device 10, "enlarge" is displayed with respect to the operation button 14C, for example.

Next, whether the operation unit 14 of the display device 10 has been operated or not is determined (Step 4). For this determination, in the display device support mode, the information that the operation unit 14 of the display device 10 has been operated is also inputted to the electronic device 100. If the operation unit 14 of the display device 10 is operated (YES in Step 4), the display on the display unit 12 of the display device 10 is updated (Step 5). The electronic device 100 acquires data about the updated display from the display device 10 (Step 2) and the display on the display unit 102 of the electronic device 100 is updated as well (Step 3).

Figure 13:
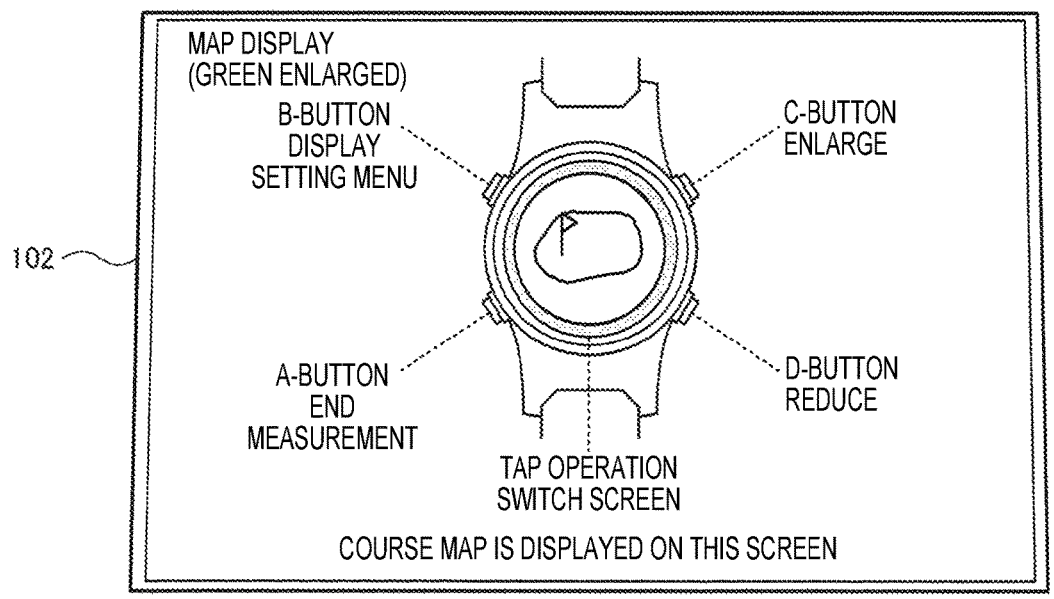
FIG. 13 shows a support screen displayed on the electronic device when the display screen on the display device is as shown in FIG. 7.

FIGS. 7 and 13 show the updated display after the operation button 14C of the display device 10 is operated when in the display state shown in FIGS. 6 and 12. In FIGS. 7 and 13, in response to the operation on the operation button 14C, the green as a part of the object of the course map shown in FIGS. 6 and 12 is displayed in an enlarged manner. In FIGS. 12 and 13, only the object of the course map is updated and there is no change to the explanation of the functions of the display unit 12 and the operation unit 14.

Figure 14:
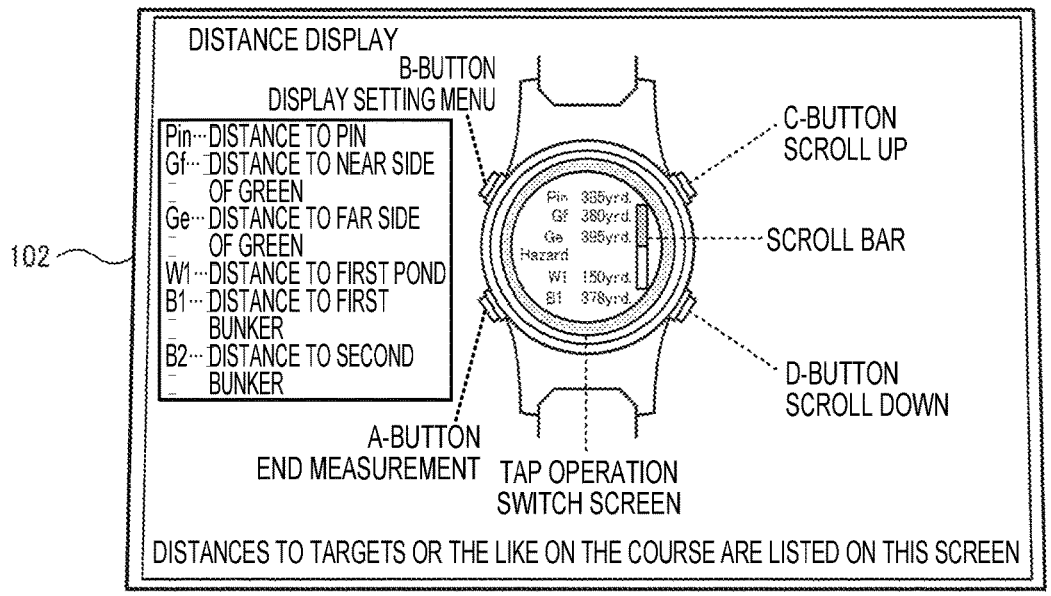
FIG. 14 shows a support screen displayed on the electronic device when the display screen on the display device is as shown in FIG. 8.

FIGS. 8 and 14 show the updated display after a tap operation is done on the display device 10 when in the display state shown in FIGS. 6 and 12. In FIGS. 8 and 14, in response to the tap operation on the display device 10, the object of the course map shown in FIGS. 6 and 12 is updated to the object of the scroll bar and the character information of the display of the distance. In FIG. 14, as the explanation of the function of the display unit 12 of the display device 10, "the distances of targets and the like on the course are displayed in a list on this screen" is displayed as the result of update. Also, as the explanation of the function of the display unit 12 of the display device 10, the meaning of the two alphabet letters indicating each target is updated and the updated meaning is displayed. As the explanation of the function of the operation unit 14 of the display device 10, "scroll up" is displayed as the result of update with respect to the operation button 14C, for example.

As described above, when Step 3 shown in FIG. 11 is executed for a second time, whether the operation unit 14 of the display device 10 has been operated or not is determined again (Step 4). Here, if the operation unit 14 of the display device 10 is operated again (YES in Step 4), the display on the display unit 12 of the display device 10 is updated again (Step 5). The electronic device 100 acquires data about the updated display from the display device 10 (Step 2) and the display on the display unit 102 of the electronic device 100 is also updated again (Step 3).

Figure 15:
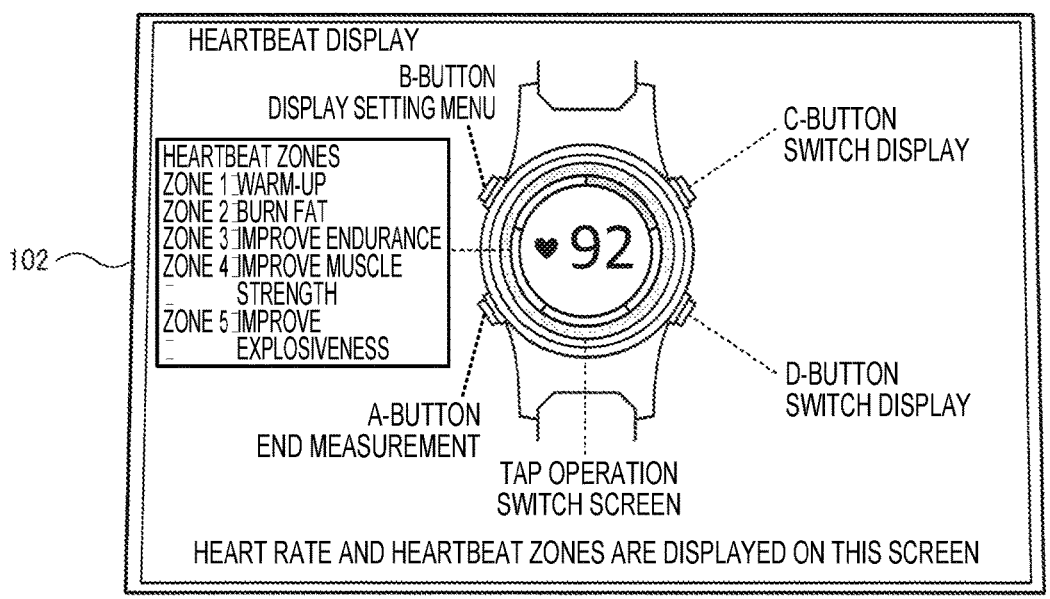
FIG. 15 shows a support screen displayed on the electronic device when the display screen on the display device is as shown in FIG. 9.

FIGS. 9 and 15 show the updated display after a tap operation is done on the display device 10 when in the updated display state shown in FIGS. 8 and 14. In FIGS. 9 and 15, in response to the tap operation on the display device 10, the object of the scroll bar shown in FIGS. 8 and 14 is updated to the objects of a heart indicating heartbeat and of heartbeat zones, and a number indicating heart rate. In FIG. 15, as the explanation of the function of the display unit 12 of the display device 10, "the heart rate and heartbeat zones are displayed in a list on this screen" is displayed as the result of update. Also, as the explanation of the function of the display unit 12 of the display device 10, the meanings of the heartbeat zones 1 to 5 are displayed. As the explanation of the function of the operation unit 14 of the display device 10, "switch display" is displayed as the result of update with respect to the operation button 14C, for example.

In FIG. 11, if the operation unit 14 of the display device 10 is not operated (NO in Step 4), whether a communication environment has been established between the display device 10 and the electronic device 100 is determined (Step 6). If a communication environment has been established, whether a predetermined operation has been carried out via the operation unit 104 of the electronic device 100 or not is determined (Step 7). In the embodiment, in the display device support mode, only a predetermined operation on the electronic device 100 is accepted. This predetermined operation can be, for example, "back", "skip", "forced termination", "from the beginning" or the like. When such a predetermined operation is carried out on the side of the electronic device 100 (YES in Step 7), the operation information is transmitted from the electronic device 100 to the display device 10 (Step 8) and the display on the display device 10 is updated (Step 9). Also, by the operation on the electronic device 100, Step 3 to update the display content on the display unit 102 on the basis of the function of the electronic device 100 is executed. Thus, the displays on the display device 10 and the electronic device 100 are updated not only in response to an operation on the display device 10 but also in response to a predetermined operation on the electronic device 100. Thus, in the display device support mode, the user can have a simulated experience of the user of the electronic device 100 on a golf course by operating the display device 10 or the electronic device 100. This enables the user to make full use of the display device 10 without relying on the electronic device 100 when using the display device 10 on a golf course. The display device support mode ends at the time when a communication environment is no longer established between the display device 10 and the electronic device 100 in Step 6.

4. Modifications

The embodiment has been described above in detail. However, a person skilled in the art can readily understand that a number of modifications can be made without substantially departing from the new matters and advantageous effects of the invention. Therefore, all such modifications are included in the scope of the invention. For example, while the device to be supported in the embodiment is a display device, it is a matter of course that the invention can be applied to a device having at least one of a display unit and an operation unit.

4.1. Modification 1 of Display Device and Display Example on Electronic Device

Figure 16:
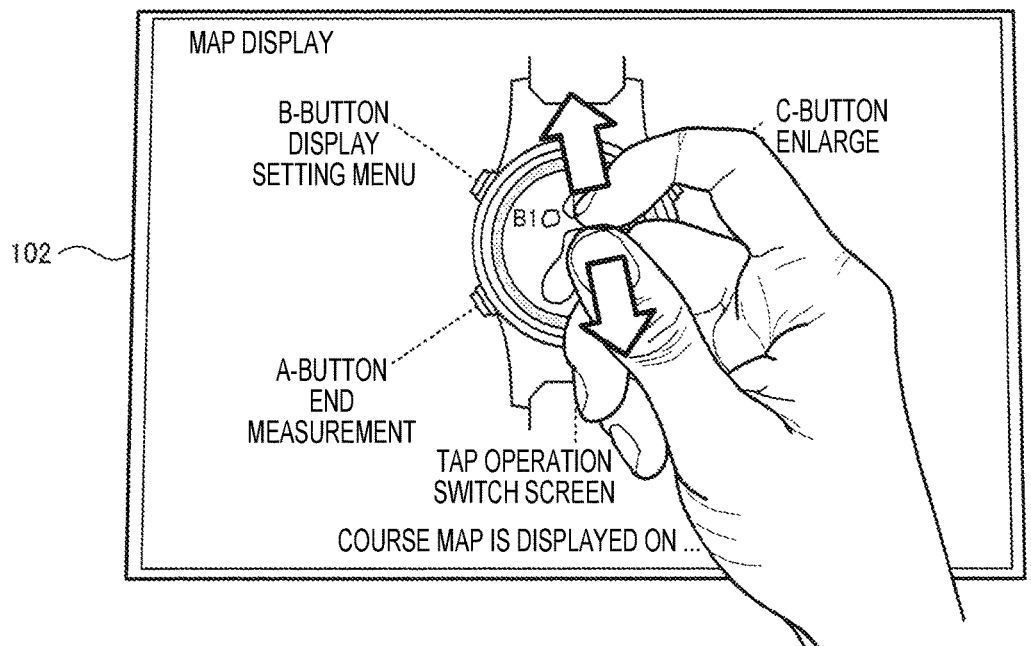
FIG. 16 shows a display example which replaces FIG. 12 when the display unit of the display device is a touch panel.
Figure 17:
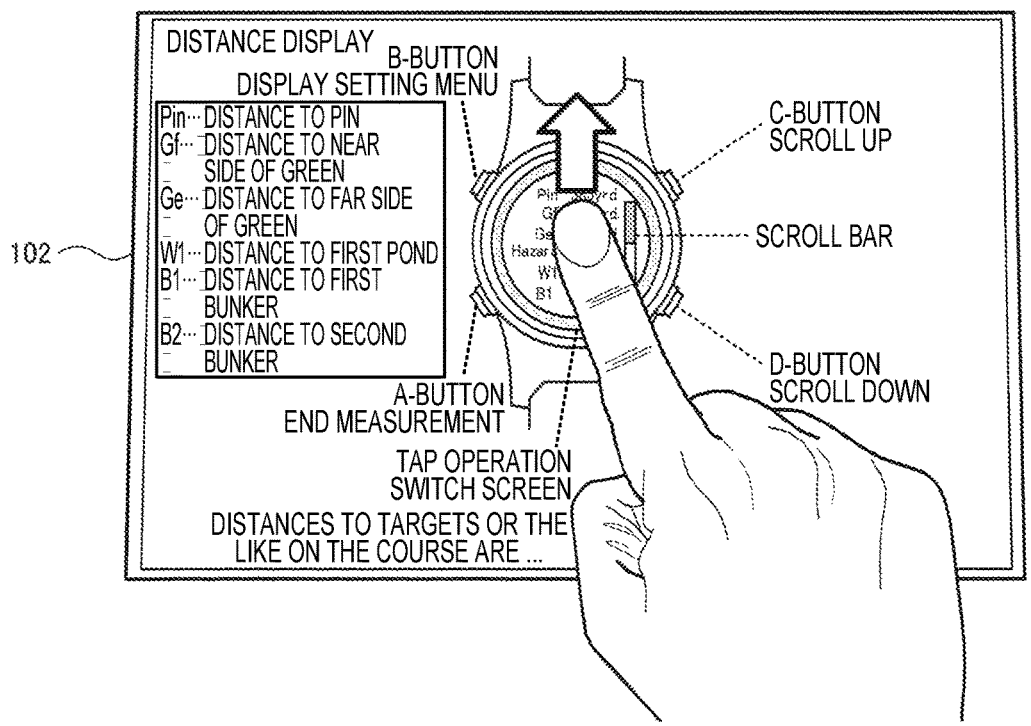
FIG. 17 shows a display example which replaces FIG. 14 when the display unit of the display device is a touch panel.

In the display device 10 shown in FIGS. 2 to 4, the display unit 12 can be a touch panel. In this case, instead of the displays shown in FIGS. 12 and 14, the objects shown in FIGS. 16 and 17 are displayed on the display unit 102 of the electronic device 100. In FIGS. 16 and 17, objects of a fingertip indicating an operation on the touch panel and of an arrow indicating the direction of the movement of the fingertip are displayed in addition to the objects shown in FIGS. 12 to 14. Although not illustrated in FIGS. 16 and 17, characters such as "swipe: switch screen", "long press: detailed display", "pinch out: enlarge", "pinch in: reduce", "flick: scroll screen" and the like can be displayed as the explanation of the function of the touch panel operation unit.

4.2. Modification 2 of Display Device and Display Example on Electronic Device

Figures 18, 19:
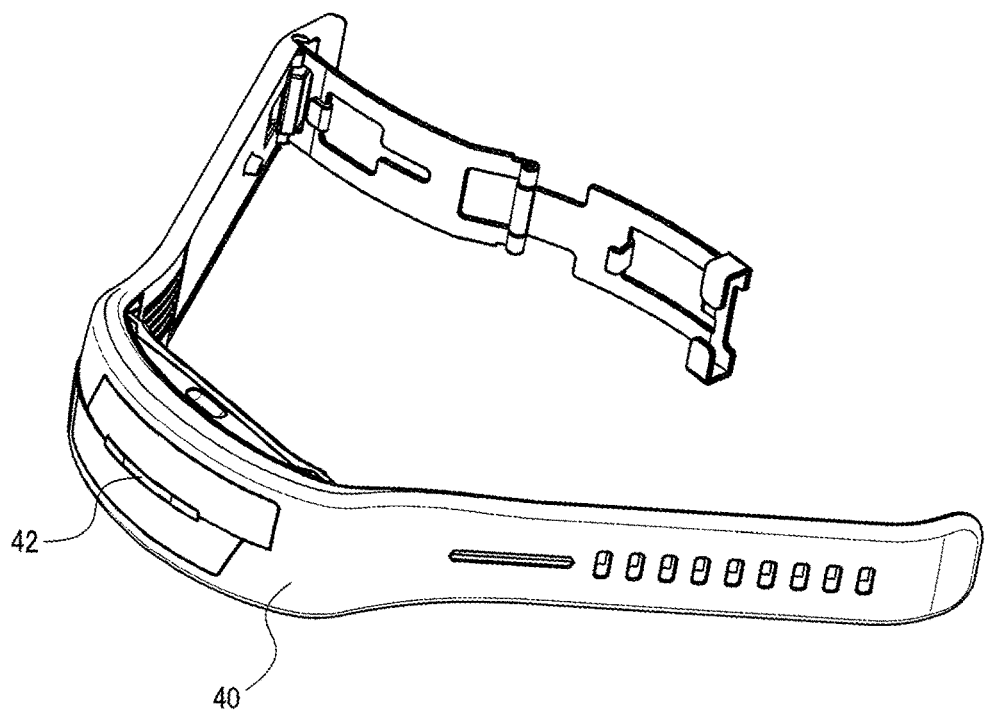
FIG. 18 shows a display device in which display unit is a light emitting unit.
FIG. 19 shows a display example displayed on the display unit of an electronic device which supports the display device shown in FIG. 18.

FIG. 18 shows a display device 40 which has a display unit having no display screen or operation button and made up of a light emitting unit 42, and an operation unit to which a touch operation is inputted. The display unit (light emitting unit) 42 notifies the user of information of the heartbeat zone, for example, by turning on or flashing an LED or the like. The display device 40 shown in FIG. 18 does not need the clock unit 26 and the GPS unit 28 shown in FIG. 5 and is provided with the display unit (light emitting unit) 42 and its driver, instead of the display unit 12 and the display driver 24.

FIG. 19 shows a display example displayed on the display unit 102 of the electronic device 100 supporting the display device 40 shown in FIG. 18. FIG. 19 shows an explanation in which seven heartbeat zones are expressed by lighting or flashing of five LEDs. Here, for the warm-up zone, one LED flashes. For the explosiveness and athletic ability improvement zone, the five LEDs flash more quickly. In the remaining five zones, one to five LEDs turn on. Thus, the seven heartbeat zones are discriminated from each other. While FIG. 19 shows the objects (five LEDs) of the display unit (light emitting unit) 42 and an explanation of their functions, an explanation of a touch operation may be added to this.

The display device 40 is not limited to the wrist-wearable portable device and may be an inertial sensor unit which is attached to an exercise tool such as a tennis racket or baseball bat, detects a swing of the exercise tool, and has a light emitting unit (display unit) such as an LED.

4.3. Modification of Electronic Device

Figure 20:
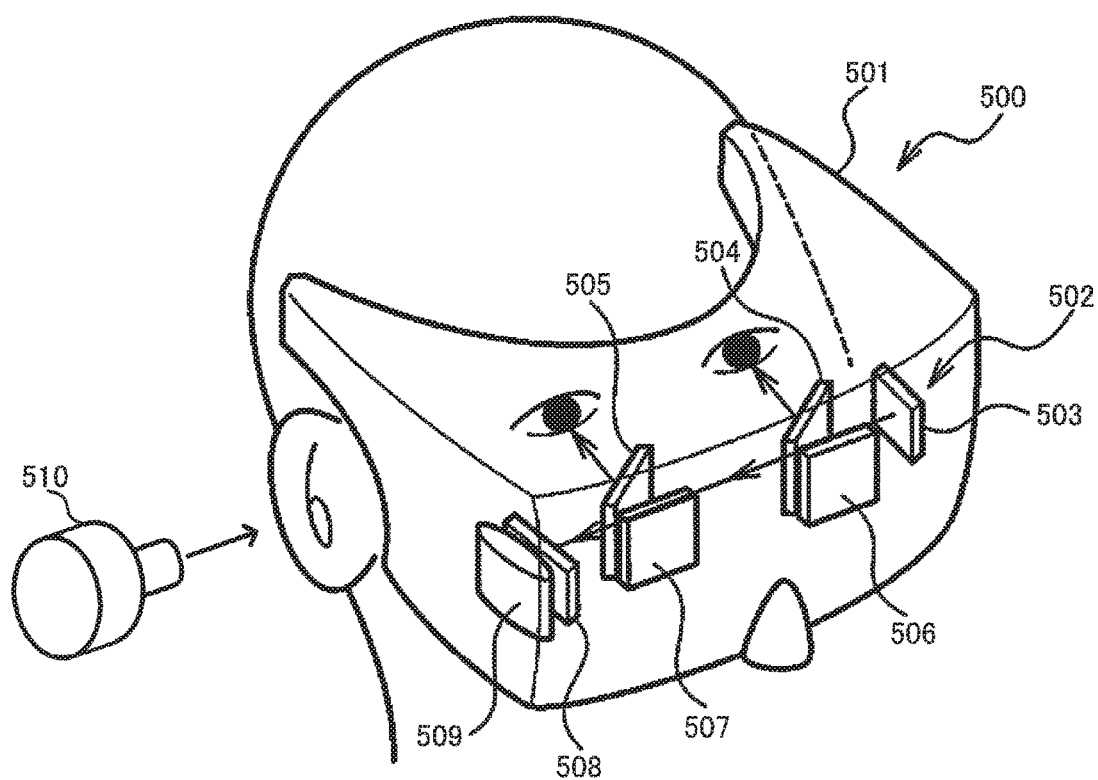
FIG. 20 shows a modification of the electronic device.

FIG. 20 shows a head-mounted electronic device (HMD (head-mounted display)) as an electronic device replacing the electronic device 100 shown in FIGS. 2 to 4 such as a smartphone or PC.

As shown in FIG. 20, an HMD 500 has an eyeglasses main body 501 mounted on the user's head. The eyeglasses main body 501 is provided with a display unit 502. The display unit 502 integrates a luminous flux emitted from an image display unit 503 with a luminous flux heading toward the user's eyes from the external field and thus superimposes a virtual image from the image display unit 503 on the real image of the external field viewed from the user.

The display unit 502 includes, for example, the image display unit 503 such as an LCD (liquid crystal display), a first beam splitter 504, a second beam splitter 505, a first concave reflection mirror 506, a second concave reflection mirror 507, a shutter 508, and a convex lens 509.

The first beam splitter 504 is arranged in front of the user's left eye and partly transmits and partly reflects the light emitted from the image display unit 503.

The second beam splitter 505 is arranged in front of the user's right eye and partly transmits and partly reflects the partly transmitted light from the first beam splitter 504.

The first concave reflection mirror 506 is arranged in front of the first beam splitter 504, partly reflects the partly reflected light from the first beam splitter 504, causes this light to be transmitted through the first beam splitter 504, and thus guides this light to the user's left eye.

The second concave reflection mirror 507 is arranged in front of the second beam splitter 505, partly reflects the partly reflected light from the second beam splitter 505, causes this light to be transmitted through the second beam splitter 505, and thus guides this light to the user's right eye.

The convex lens 509 guides the partly transmitted light from the second beam splitter 505 to outside the HMD 500 when the shutter 508 is opened.

With the HMD 500, the user can check the display without holding the electronic device in the hand. Therefore, if the HMD 500 is used as a support device for the display device 10 or 40, the HMD 500 can be used as a support device for the display device 10 or 40 even when the user carries the display device 10 or 40.

What is claimed is:

1. A timepiece support method implemented by a central processing unit (CPU), the method comprising:
    causing an electronic device to acquire information of an object displayed on a timepiece to be attached to a user, the electronic device including a display device, and the timepiece having an operation button; and
    displaying: (i) an image of the timepiece including the object, and text data of a written explanation of the object; and (ii) an image of the operation button, and a function of the operation button, on the display device of the electronic device, using the information of the object that is acquired by the electronic device and supplementary information including the text data of the written explanation of the object, wherein
    the operation button of the timepiece receives input from the user in order to perform the function of the operation button,
    when the operation button of the timepiece is operated, the image of the timepiece on the display device is updated,
    when the operation button of the timepiece is not operated, a determination is made as to whether a predetermined operation has been performed via the image of the operation button displayed on the display device of the electronic device, and
    when the determination indicates that the predetermined operation has been performed, the object on the timepiece is updated.

2. The timepiece support method according to claim 1, further comprising:
    explaining the function of the operation button on the display of the display device.

3. The timepiece support method according to claim 1, further comprising:
    acquiring input information inputted to the timepiece in order to change a display content displayed on the timepiece; and
    changing the object displayed on the display device according to the display content on the basis of the input information and displaying the changed object.

4. The timepiece support method according to claim 3, wherein
    the function of the object displayed on the display device is changed according to the display content, using the supplementary information, and the changed object is displayed.

5. The timepiece support method according to claim 3, further comprising:
    changing the object displayed on the display device to another object on the basis of information other than the supplementary information that is preset in the electronic device, when an operation button provided in the electronic device is operated.

6. An electronic device comprising:
    a central processing unit (CPU) programmed to acquire information of an object displayed on a timepiece to be attached to a user, the timepiece having an operation button; and
    a display device which displays: (i) an image of the timepiece including the object, and text data of a written explanation of the object; and (ii) an image of the operation button, and a function of the operation button, using the information of the object that is acquired and supplementary information including the text data of the written explanation of the object, wherein the operation button of the timepiece receives input from the user in order to perform the function of the operation button, and when the operation button of the timepiece is operated, the image of the timepiece on the display device is updated, when the operation button of the timepiece is not operated, a determination is made as to whether a predetermined operation has been performed via the image of the operation button displayed on the display device of the electronic device, and when the determination indicates that the predetermined operation has been performed, the object on the timepiece is updated.

7. The electronic device according to claim 6, wherein the display device has a larger display area than a display area of the timepiece.

8. The electronic device according to claim 6, further comprising:
an operation button to which information to change the object displayed on the display device to another object is inputted.

9. A timepiece support system comprising:
a timepiece which is attached to a user and displays an object, the timepiece having an operation button; and
an electronic device which supports an operation of the timepiece,
wherein the electronic device includes:
a central processing unit (CPU) programmed to acquire information of the object displayed on the timepiece, and
a display device which displays: (i) an image of the timepiece including the object, and text data of a written explanation of the object; and (ii) an image of the operation button, and a function of the operation button, using the information of the object that is acquired and supplementary information including the text data of the written explanation of the object, wherein the operation button of the timepiece receives input from the user in order to perform the function of the operation button, when the operation button of the timepiece is operated, the image of the timepiece on the display device is updated, when the operation button of the timepiece is not operated, a determination is made as to whether a predetermined operation has been performed via the image of the operation button displayed on the display device of the electronic device, when the determination indicates that the predetermined operation has been performed, the object on the timepiece is updated, and the display device has a larger display area than a display area of the timepiece.

10. A non-transitory computer-readable recording medium having a timepiece support program recorded therein, the program causing a computer to execute:
acquiring information of an object displayed by a timepiece to be attached to a user, the timepiece having an operation button; and
causing a display device of the computer to display: (i) an image of the timepiece including the object, and text data of a written explanation of the object; and (ii) an image of the operation button, and a function of the operation button, on the display device, using the information of the object that is acquired and supplementary information including the text data of the written explanation of the object, wherein the operation button of the timepiece receives input from the user in order to perform the function of the operation button, when the operation button of the timepiece is operated, the image of the timepiece on the display device is updated, when the operation button of the timepiece is not operated, a determination is made as to whether a predetermined operation has been performed via the image of the operation button displayed on the display device of the computer, and when the determination indicates that the predetermined operation has been performed, the object on the timepiece is updated.

11. A timepiece support method implemented by a central processing unit (CPU), the method comprising:
establishing a communication environment between: (i) a timepiece to be attached to a user, the timepiece including an operation button, and (ii) an electronic device, the electronic device including a display device, the communication environment enabling the electronic device to acquire information about a function of at least one of the operation button and the timepiece; and
causing the electronic device to output an image of the at least one of the operation button and the timepiece, and the function of the at least one of the operation button and the timepiece, using the information that is acquired, wherein the operation button receives input from the user in order to perform the function of the operation button, and when the operation button of the timepiece is operated, the image of the timepiece on the electronic device is updated, when the operation button of the timepiece is not operated, a determination is made as to whether a predetermined operation has been performed via the image of the at least one of the operation button and the timepiece displayed on the display device of the electronic device, and when the determination indicates that the predetermined operation has been performed, the image on the timepiece is updated.

12. A timepiece support method implemented by a central processing unit (CPU), the method comprising:
causing an electronic device to acquire, from a timepiece to be attached to a user and including an operation button, information about a function of the operation button, the electronic device including a display device,
wherein the operation button receives input from the user in order to perform the function of the operation button; and when the operation button is operated, outputting an image of the operation button and the function on the display device of the electronic device, using the information that is acquired, and updating the image that is output, when the operation button of the timepiece is not operated, a determination is made as to whether a predetermined operation has been performed via the image of the operation button output on the display device of the electronic device, and when the determination indicates that the predetermined operation has been performed, the image on the timepiece is updated.

13. A timepiece support system comprising:
a timepiece which is to be attached to a user, the timepiece having an operation button and displaying an object; and
an electronic device separate from the timepiece, which supports an operation of the timepiece,
wherein the electronic device includes:
 a central processing unit (CPU) programmed to acquire information of the object from the timepiece over a network, and
 a display device which displays: (i) an image of the timepiece including the object, and text data of a written explanation of the object; and (ii) an image of the operation button of the timepiece, and a function of the operation button, using the information of the object that is acquired by the electronic device, the display device further displaying supplementary information including text data of a written explanation of the object not displayed on the timepiece,
the operation button receives input from the user in order to perform the function of the operation button,
when the operation button of the timepiece is operated, the image of the timepiece on the electronic device is updated,
when the operation button of the timepiece is not operated, a determination is made as to whether a predetermined operation has been performed via the image of the operation button displayed on the display device of the electronic device,
when the determination indicates that the predetermined operation has been performed, the object on the timepiece is updated, and
the display device has a larger display area than the timepiece.

* * * * *